No. 696,235. Patented Mar. 25, 1902.
G. W. GREENWOOD.
KNEE JOINT OR HINGE CONNECTION.
Application filed July 12, 1901.
(No Model.)
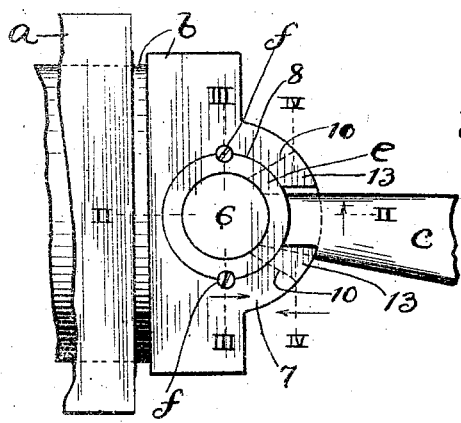
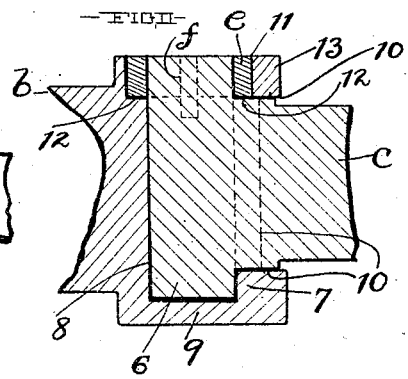
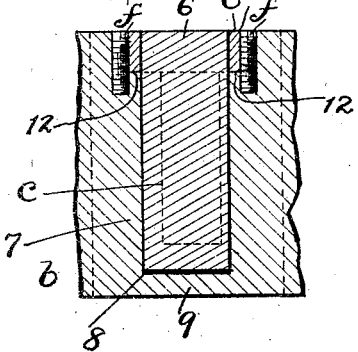
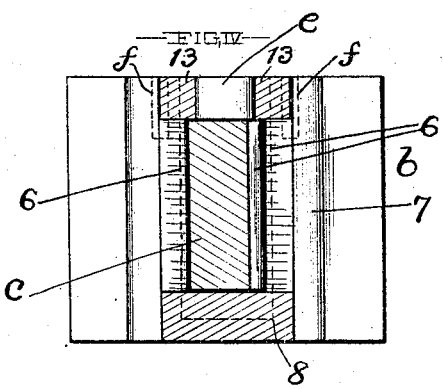
WITNESSES:
Daniel E. Daly.
A. H. Parratt.
INVENTOR
George W. Greenwood
BY
Lynch & Dorer
his ATTORNEYS

UNITED STATES PATENT OFFICE.

GEORGE W. GREENWOOD, OF CLEVELAND, OHIO.

KNEE-JOINT OR HINGE CONNECTION.

SPECIFICATION forming part of Letters Patent No. 696,235, dated March 25, 1902.

Application filed July 12, 1901. Serial No. 67,969. (No model.)

*To all whom it may concern:*

Be it known that I, GEORGE W. GREENWOOD, a resident of Cleveland, in the county of Cuyahoga and State of Ohio, have invented certain new and useful Improvements in Knee-Joints or Hinge Connections; and I do hereby declare the following to be a full, clear, and exact description of the invention, such as will enable others skilled in the art to which it pertains to make and use the same.

My invention relates to improvements in knee-joints or hinge connections between two parts or members of a machine wherein the said parts or members are adapted to be actuated for the purpose of transmitting power.

The primary object of this invention is to provide a materially-improved construction of knee-joint or hinge connection between said two parts or members of the machine, to render the assemblage of the said parts convenient, to render the joint strong, durable, and inexpensive, to provide the joint with large wearing-surfaces, to avoid the use of a bolt or pin, which is liable to be sheared off, to avoid lost motion, and to generally maintain the parts properly assembled and in a satisfactorily working condition.

With this object in view the invention consists in certain features of construction and combinations of parts hereinafter described, and pointed out in the claims.

In the accompanying drawings, Figure I is an exterior view of a joint or hinge connection embodying my invention. Fig. II is a section on line II II, Fig. I, looking in the direction indicated by the arrow. Fig. III is a section on line III III, Fig. I, looking in the direction indicated by the arrow. Fig. IV is a section on line IV IV, Fig. I, looking in the direction indicated by the arrow.

Referring to the drawings, $a$ designates a cylinder or case containing a piston, plunger, or slide $b$, adapted to reciprocate or operate endwise of the cylinder or case $a$, and $c$ represents a pitman, rod, or link employed in the transmission of power from or to the aforesaid reciprocating member $b$. The members $b$ and $c$ are therefore joined together by a knee-joint or hinge connection capable of permitting the part $c$ to move into or assume different angular positions relative to the part $b$, and the improved construction of knee-joint or hinge connection between the parts $b$ and $c$ or between two parts of any machine constitutes the subject-matter of this application.

The part $c$ terminates at its end which is connected to the part $b$ in a journal or bearing 6, which is contained within a corresponding box 7, formed upon the adjacent end of the part $b$. The box 7 has therefore a cylindrical chamber 8, engaged by the journal 6. The chamber 8 extends to one end of the box, as at 11, but is preferably closed at its opposite end, as at 9, to reduce to a minimum the liability of dirt, dust, &c., obtaining ingress between the opposing surfaces of the journal and the surrounding wall of the chamber 8, and the said wall affords bearing for the journal 6 and is slotted laterally, as at 10, to accommodate the location and operation of the part $c$. The journal 6 extends beyond the remaining or contiguous portion of the part $c$ longitudinally of the box 7, and the surrounding wall of the chamber 8 completely surrounds the said journal at the closed end of the chamber, so as to form the largest possible bearing for the journal at the said end of the chamber. The chamber 8 is enlarged diametrically at its opposite end to form a shoulder 12, extending from one of the side walls of the slot 10 circumferentially of the journal 6 to the other side wall of the said slot. A metallic ring or annular bushing $e$ is seated against the shoulder 12 and completely surrounds the journal at the enlarged end of the chamber 8. The bushing $e$ snugly occupies the enlarged end of the chamber 8 and is arranged, preferably, with its outer surface flush with the adjacent end of the box 7. The bushing $e$ is removably secured to the box 7, preferably by two screws $f$ and $f$, which are arranged diametrically opposite each other at opposite sides, respectively, of the journal 6 and engage correspondingly-threaded holes formed partially in the bushing and partially in the bushing embracing wall of the enlarged end of the chamber 8, and the said screws are screwed in preferably flush with the adjacent end of the box. The bushing $e$ constitutes a member of the box 7 and affords the largest possible bearing for the journal end which is embraced by the said bushing.

In assembling the parts the part c is of course placed in position before the application of the bushing e, with the journal 6 in proper engagement with the chamber 8, whereupon the bushing e and the screws f are applied, and the slot 10 is open at its end which is adjacent to the bushing to accommodate the assemblage of the parts, and preferably the said slot 10 is narrower at its open end adjacent to the bushing-embraced end of the journal to enlarge the bushing-surrounding portion of the box 7 circumferentially of the bushing, as at 13, and thereby enlarge the lateral support afforded to the bushing, and obviously the said reduction in the width of the slot 10 is accommodated by the extension of the journal 6 beyond the contiguous portion of the part c into the bushing.

By my improved construction of the joint or hinge connection formed between the parts b and c a large area of wearing-surfaces is obtained and the use of a separate bolt or pin is avoided, so that there is no bolt or pin liable to be sheared off during the operation of the said parts b and c.

My improved construction possesses great strength and durability, and the component parts are conveniently assembled and maintained in proper condition and are not liable to get out of order, and lost motion is avoided. It will be observed also that the bushing e not only affords a desirable bearing for the journal 6, but, being rigidly secured in place, prevents displacement of the part c endwise of the box 7.

What I claim is—

1. A knee-joint or hinge connection between two parts or members of a machine comprising a journal 6 formed on one part and a box formed on the other part and having its chamber engaged by the journal and having the surrounding wall of its chamber provided with a lateral slot 10 to accommodate the location and operation of the journal-forming part; which slot is open at one end of the said chamber; a bearing-affording member e embracing the journal adjacent to the open end of the slot, and means for securing the said bearing-affording member in place, and the aforesaid slot being reduced in width adjacent to the bearing-affording member, substantially as and for the purpose set forth.

2. A knee-joint or hinge connection between two parts or members of a machine, comprising a journal 6 formed on one part, and a box formed on the other part and having its chamber engaged by the journal and having the surrounding wall of the said chamber provided with a lateral slot 10 to accommodate the location and operation of the journal-forming part, which chamber is enlarged, at one end; a bushing e within the said enlarged end of the chamber, and screws removably securing the bushing in place and engaging correspondingly-threaded holes formed partially in the bushing and partially in the bushing-surrounding portion of the aforesaid wall, and the journal extending into and having bearing in the said bushing.

3. A knee-joint or hinge connection between two parts or members of a machine, comprising a journal 6 formed on one part, and a box formed on the other part and having its chamber engaged by the journal and having the surrounding wall of the said chamber provided with a lateral slot 10 to accommodate the location and operation of the journal-forming part, which chamber is enlarged, at one end; a bushing e within the said enlarged end of the chamber, and means securing the bushing in place, and the journal extending into and having bearing in the said bushing, and the aforesaid slot being reduced in width adjacent to the bushing so as to enlarge the bushing-embracing portion of the box circumferentially of the bushing, as at 13, substantially as and for the purpose set forth.

Signed by me at Cleveland, Ohio, this 6th day of July, 1901.

GEORGE W. GREENWOOD.

Witnesses:
C. H. DORER,
A. H. PARRATT.